United States Patent
Cheon et al.

(10) Patent No.: US 12,478,245 B2
(45) Date of Patent: Nov. 25, 2025

(54) ENDOSCOPE MODULE AND MODULAR ENDOSCOPIC DEVICE INCLUDING THE SAME

(71) Applicant: ROEN Surgical, Inc., Daejeon (KR)

(72) Inventors: Byung Sik Cheon, Daejeon (KR); Dong Soo Kwon, Daejeon (KR)

(73) Assignee: ROEN Surgical, Inc., Daejeon (KR)

( * ) Notice: Subject to any disclaimer, the term of this patent is extended or adjusted under 35 U.S.C. 154(b) by 646 days.

(21) Appl. No.: 17/594,280

(22) PCT Filed: Aug. 29, 2019

(86) PCT No.: PCT/KR2019/011049
§ 371 (c)(1),
(2) Date: Oct. 8, 2021

(87) PCT Pub. No.: WO2020/209451
PCT Pub. Date: Oct. 15, 2020

(65) Prior Publication Data
US 2022/0160212 A1    May 26, 2022

(30) Foreign Application Priority Data
Apr. 10, 2019 (KR) .................. 10-2019-0042087

(51) Int. Cl.
*A61B 1/00* (2006.01)
*A61B 1/005* (2006.01)
*A61B 1/05* (2006.01)

(52) U.S. Cl.
CPC ...... *A61B 1/00105* (2013.01); *A61B 1/00135* (2013.01); *A61B 1/0057* (2013.01); *A61B 1/05* (2013.01)

(58) Field of Classification Search
CPC . A61B 1/00052; A61B 1/053; A61B 1/00105; A61B 1/00135; A61B 1/0057;
(Continued)

(56) References Cited

U.S. PATENT DOCUMENTS 6,554,765 B1 * 4/2003 Yarush ............... A61B 1/00108
                                                           600/109
7,780,593 B2 * 8/2010 Ueno ................. G02B 23/2453
                                                           600/130
(Continued)

FOREIGN PATENT DOCUMENTS

| JP | H01104237 A | 4/1989 |
| JP | H07116111 A | 5/1995 |
| WO | 2008086497 A1 | 7/2008 |

OTHER PUBLICATIONS

International Search Report and Written Opinion dated Jan. 8, 2020 in connection with PCT/KR2019/011049 filed on Aug. 29, 2019.

*Primary Examiner* — Michael J Carey
*Assistant Examiner* — Megan Elizabeth Monahan
(74) *Attorney, Agent, or Firm* — Downs Rachlin Martin PLLC (57) ABSTRACT

A modular endoscopic device includes a base portion, a driver provided in the base portion, and an endoscope module including an endoscope housing detachably provided in the base portion, an insertion tube including a bendable bending portion and connected to the endoscope housing to be inserted into a body of a subject, and a bending wire configured to transfer a force to bend the bending portion. The endoscope module is detachably attachable to the base portion. The driver is configured to transfer power to the bending wire when the endoscope module is attached to the base portion, and the driver is configured not to transfer power to the bending wire when the endoscope module is detached from the base portion.

11 Claims, 7 Drawing Sheets (58) Field of Classification Search
CPC ............... A61B 1/05; A61B 5/150267; A61B 2019/2223; A61B 34/37
See application file for complete search history.

(56) References Cited

U.S. PATENT DOCUMENTS

| | | | |
|---|---|---|---|
| 8,992,565 B2 | 3/2015 | Brisson et al. | |
| 9,107,573 B2 | 8/2015 | Birnkrant | |
| 2003/0045778 A1 | 3/2003 | Ohline et al. | |
| 2006/0287576 A1* | 12/2006 | Tsuji | A61B 1/00105 600/132 |
| 2007/0129604 A1 | 6/2007 | Hatcher et al. | |
| 2008/0194910 A1 | 8/2008 | Miyamoto et al. | |
| 2008/0287963 A1* | 11/2008 | Rogers | A61B 1/008 606/130 |
| 2010/0160730 A1* | 6/2010 | Konomura | G02B 23/2476 600/114 |
| 2014/0107416 A1* | 4/2014 | Birnkrant | A61B 1/00124 600/110 |
| 2014/0276923 A1* | 9/2014 | Miller | A61B 17/22004 606/128 |
| 2017/0127911 A1* | 5/2017 | Yamamoto | A61B 1/0052 |
| 2018/0078122 A1* | 3/2018 | Ikeda | A61B 1/0055 |
| 2019/0082938 A1 | 3/2019 | Okayama et al. | |
| 2019/0374095 A1* | 12/2019 | Lord | A61B 1/00121 |

\* cited by examiner

ENDOSCOPE MODULE AND MODULAR ENDOSCOPIC DEVICE INCLUDING THE SAME

TECHNICAL FIELD

Example embodiments relate to an endoscope module and a modular endoscopic device including the endoscope module.

BACKGROUND ART

A flexible or soft endoscope is capable of being inserted into a human body along a curved organ after entering the human body through a natural orifice such as mouth, anus, vagina, and urethra. The endoscope is used for doctors to examine a subject or give medical checkups while watching a display from the endoscope.

In general, such flexible endoscope is cleaned and then reused after being used for an examination or a surgical procedure by being inserted in an organ of a patient or a subject. However, when the cleaning or sterilization is not properly performed, there may be a risk that a contaminated instrument comes into contact with mucous membrane of the patient or the subject to result in a fatal infection accident.

In addition, the flexible endoscope needs to enter a human body along a narrow and curved internal organ, and thus related instruments need to be flexible and are also rigid or strong to apply a force required for a surgery or a medical procedure. Thus, a wire is generally used to transfer a driving force through the flexible endoscope, and a tendon-sheath mechanism that surrounds the wire with a sheath is used to maintain a length of the wire.

Figure 1A:
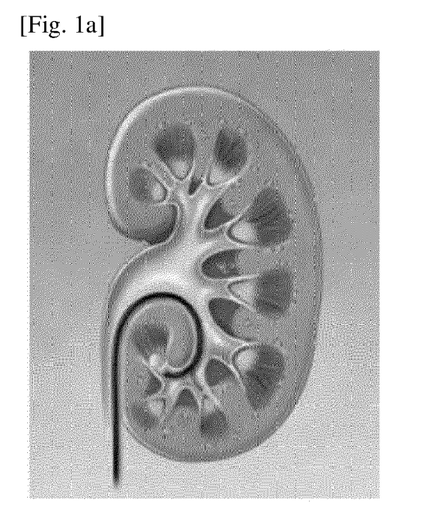
FIGS. 1a and 1b illustrate an example of removing, from a kidney, a stone formed in the kidney through a ureteroscopic endoscope.

FIG. 1a illustrates an example of how a stone formed in a kidney is removed from the kidney through a ureteroscopic endoscope. To remove the stone formed deep in the kidney through the endoscope as illustrated in FIG. 1a, an insertion tube of the endoscope may need to be bent by a large angle, for example, 180° to 270°, along a path curved inside the kidney.

Figure 1B:
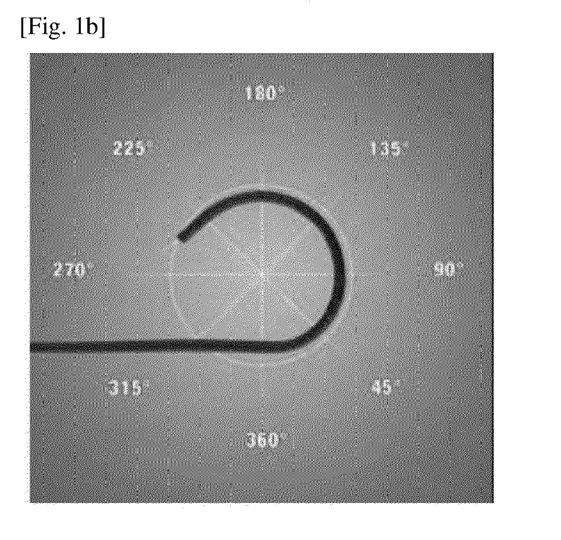

However, when the insertion tube of the endoscope is bent by an angle near to 270° as illustrated in FIGS. 1a and 1b, a frictional force between a wire configured to bend the insertion tube, and the insertion tube or a sheath may increase.

In a tendon-sheath mechanism, the frictional force between the wire and the sheath may reduce a transfer rate of tension and reduce a level of accuracy in controlling, and thus control performance of such flexible endoscope that is being bent inside a body may be degraded.

Thus, there is a growing need for the development of a disposable flexible endoscope to prevent an infection that may be caused by reusing a flexible endoscope, and minimize a reduction of driving accuracy that may be caused by a friction of a wire.

DISCLOSURE OF INVENTION

Technical Problem

An aspect provides a modular endoscopic device.

Solution to Problem

According to an example embodiment, there is provided a modular endoscopic device including a base portion, a driver provided in the base portion, and an endoscope module including an endoscope housing detachably provided in the base portion, an insertion tube including a bendable bending portion and connected to the endoscope housing to be inserted into a body of a subject, and a bending wire configured to transfer a force to bend the bending portion. The endoscope module may be detachably attachable to the base portion. When the endoscope module is attached to the base portion, the driver may transfer power to the bending wire. When the endoscope module is detached from the base portion, the driver may not transfer power to the bending wire.

The endoscope module may include a first gripper provided movably relative to the endoscope housing and configured to grab one side of the bending wire to transfer a force to the bending wire, and a second gripper provided movably relative to the endoscope housing and configured to grab another side of the bending wire to transfer a force to the bending wire. The driver may include a first driving coupler provided movably relative to the base portion and being detachably attachable to the first gripper, and a second driving coupler provided movably relative to the base portion and being detachably attachable to the second gripper.

The driver may further include a first driving source configured to drive the first driving coupler to slide along in a longitudinal direction of the insertion tube, and a second driving source configured to drive the second driving coupler to slide along in the longitudinal direction of the insertion tube.

The modular endoscopic device may further include a controller configured to operate the driver to move the first gripper and the second gripper in different directions and bend the insertion tube. The controller may repeatedly move the first gripper and the second gripper within respectively set micro-displacements to repeatedly translate the bending wire with respect to the insertion tube.

The endoscope module may further include a coil sheath configured to surround a circumference of the bending wire to be inserted into the insertion tube and guide a path through which the bending wire operates, and a sheath stopper configured to support the coil sheath to prevent the coil sheath from receding from the insertion tube.

The modular endoscopic device may further include a vibrator configured to vibrate the coil sheath by vibrating the sheath stopper to reduce a frictional force between the coil sheath and the bending wire.

The modular endoscopic device may further include a controller configured to control a magnitude of a vibration force generated through the vibrator in proportion to a bending angle of the insertion tube.

The modular endoscopic device may further include a camera housing provided in the base portion and including an imaging device, and a camera tube detachably attachable to the camera housing and connected to the imaging device to perform imaging in the bending portion of the insertion tube.

According to another example embodiment, there is provided an endoscope module including an endoscope housing, an insertion tube including a bendable bending portion and connected to the endoscope housing to be inserted into a body of a subject, a bending wire configured to transfer a force to bend the bending portion, a coil sheath configured to surround a circumference of the bending wire to be inserted into the insertion tube and guide a path through which the bending wire operates, a sheath stopper configured to support the coil sheath to prevent the coil sheath from receding from the insertion tube, and a vibrator configured to vibrate the coil sheath by vibrating the sheath stopper to reduce a frictional force between the coil sheath and the bending wire.

The endoscope module may further include a controller configured to control a magnitude of a vibration force generated through the vibrator in proportion to a bending angle of the insertion tube.

Advantageous Effects of Invention

According to example embodiments described herein, there is provided a modular endoscopic device. An endoscope module of the modular endoscopic device to be inserted into a body may be readily attachable and detachable in a modular manner, and it is thus possible to prevent an infection that may be caused by an endoscopy. In addition, the endoscope module may be disposably used and removed after being used once and a new endoscope module may be used, and it is thus possible to reduce costs for sterilization. In addition, it is possible to prevent an issue of a bending angle decreasing as an instrument ages.

According to example embodiments described herein, there is provided a modular endoscopic device. A vibrator of the modular endoscopic device may vibrate a sheath stopper to bend a flexible insertion tube and reduce a frictional resistance generated between a wire and a sheath due to buckling of the sheath. Thus, it is possible to stably increase efficiency in transferring a force through the wire and reduce a control error. This increased efficiency may enable a reduction of a loss of a bending angle of a tube into which a basket or a laser is to be inserted. Thus, the tube may effectively extract a stone formed in an area of a renal calyx inside a kidney which is reachable when the tube is bent by approximately 270°

BRIEF DESCRIPTION OF DRAWINGS

FIG. 7b is a diagram illustrating a lower surface of an area A illustrated in FIG. 7a.

MODE FOR THE INVENTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component. In addition, it should be noted that if it is described in the specification that one component is "connected," "coupled," or "joined" to another component, a third component may be "connected," "coupled," and "joined" between the first and second components, although the first component may be directly connected, coupled or joined to the second component.

Components included in one embodiment may have the same name as a component having the same function in other embodiments. Unless otherwise stated, a description of the one embodiment may be applied to the other embodiments. A detailed description of overlapping portions between embodiments will be omitted.

Figure 2:
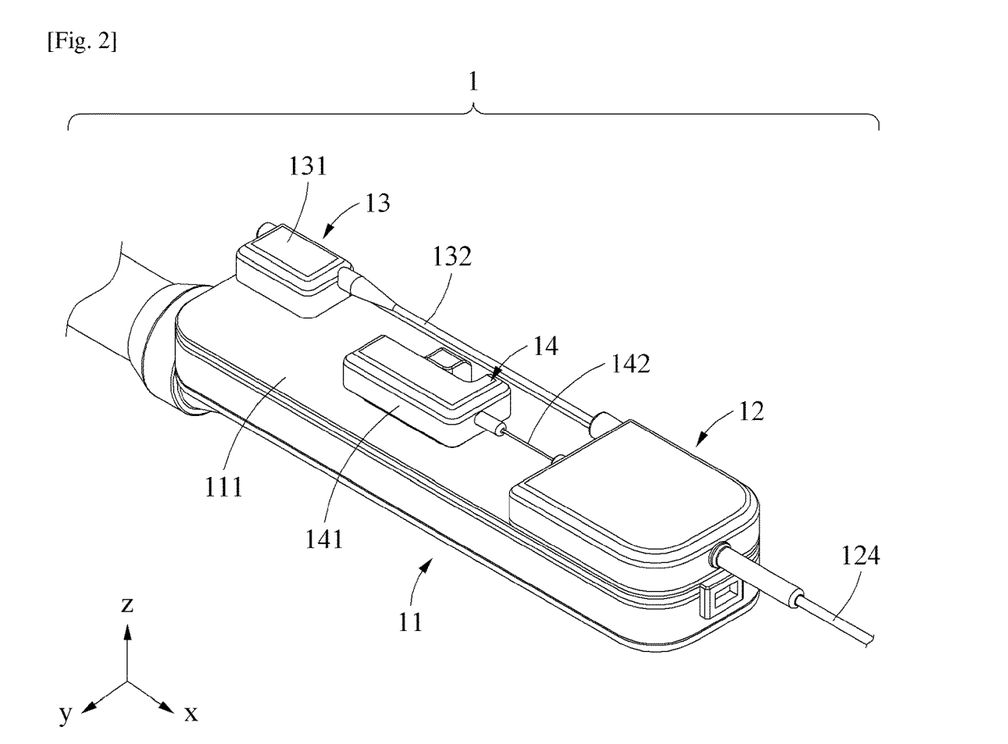
FIG. 2 is a perspective view of a modular endoscopic device according to an example embodiment.
Figure 3:
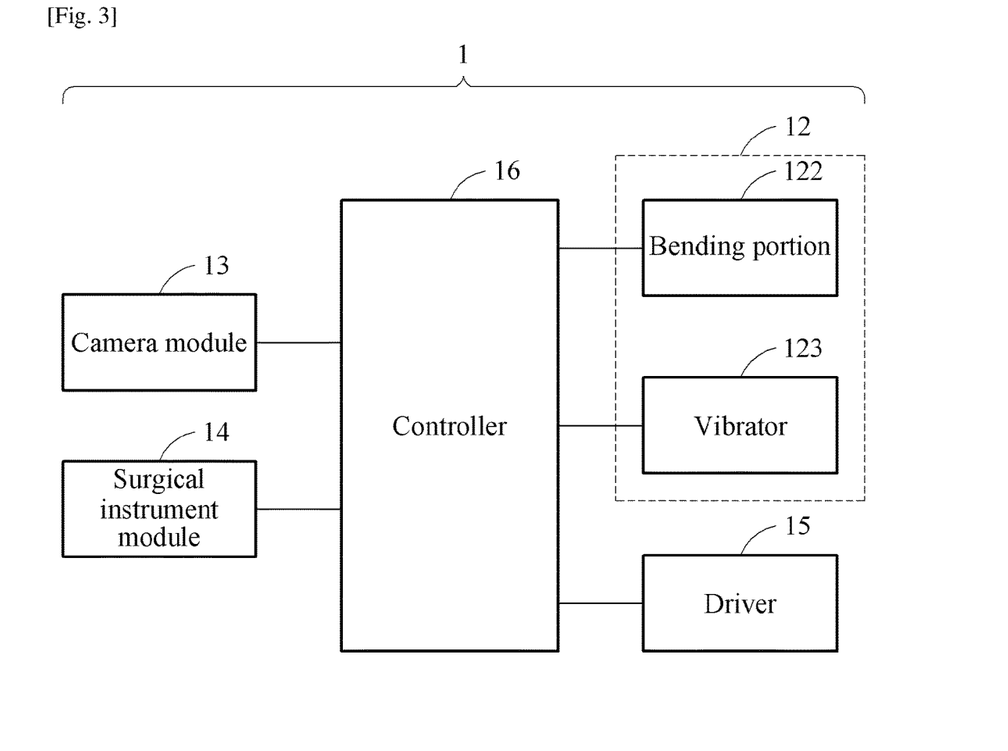
FIG. 3 is a block diagram of a modular endoscopic device according to an example embodiment.
Figure 4:
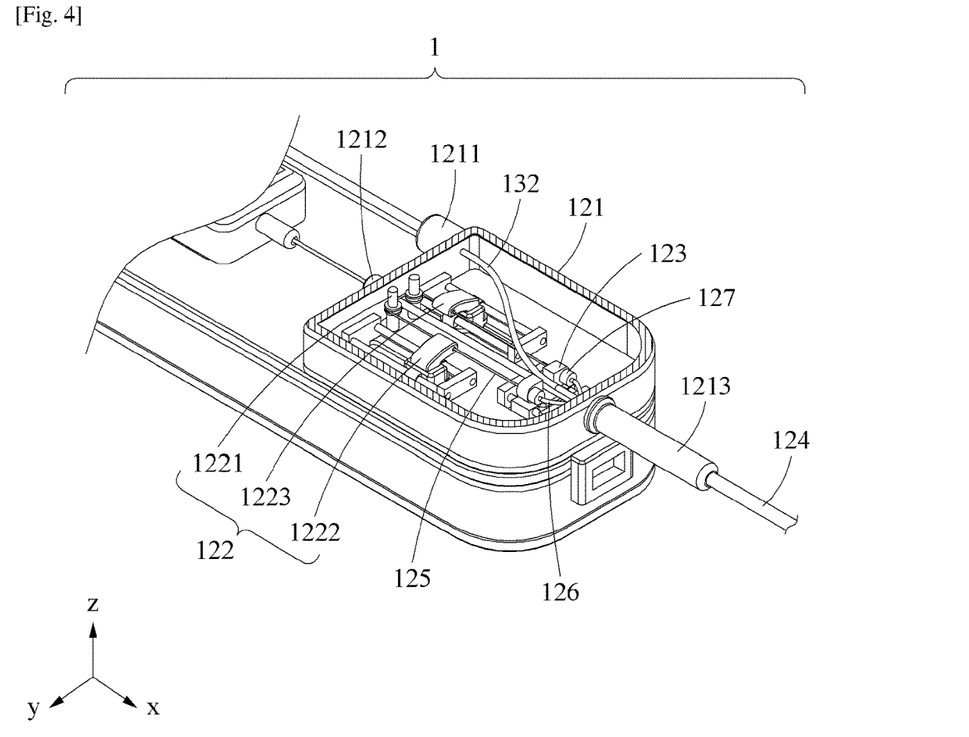
FIG. 4 is a partial perspective view of an interior of an endoscope module according to an example embodiment.
Figure 5A:
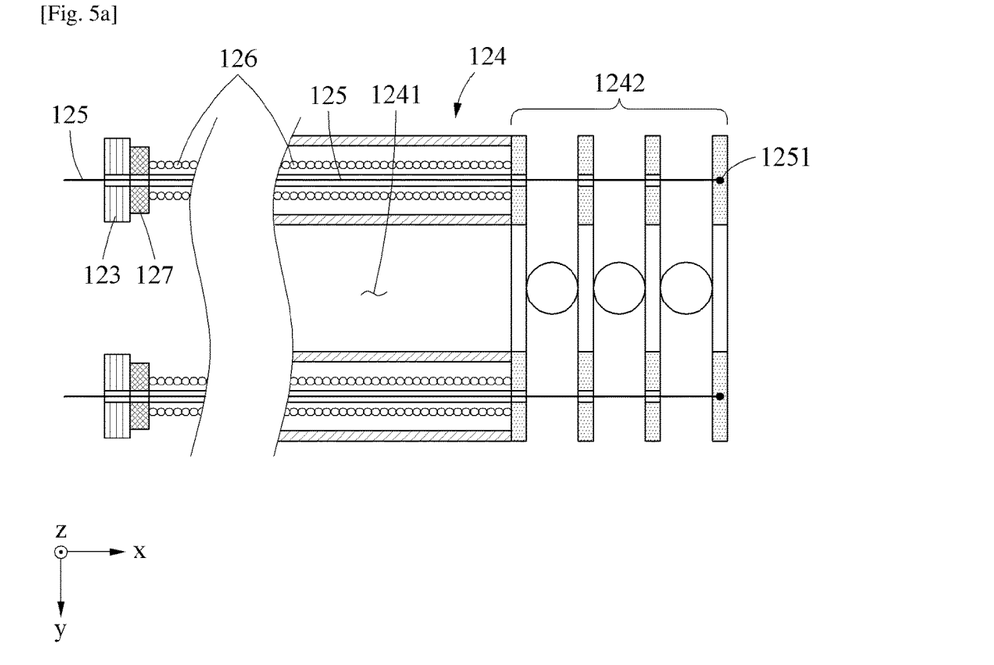
FIGS. 5a and 5b are cross-sectional views illustrating how a bending wire and a coil sheath are connected according to an example embodiment.
Figure 5B:
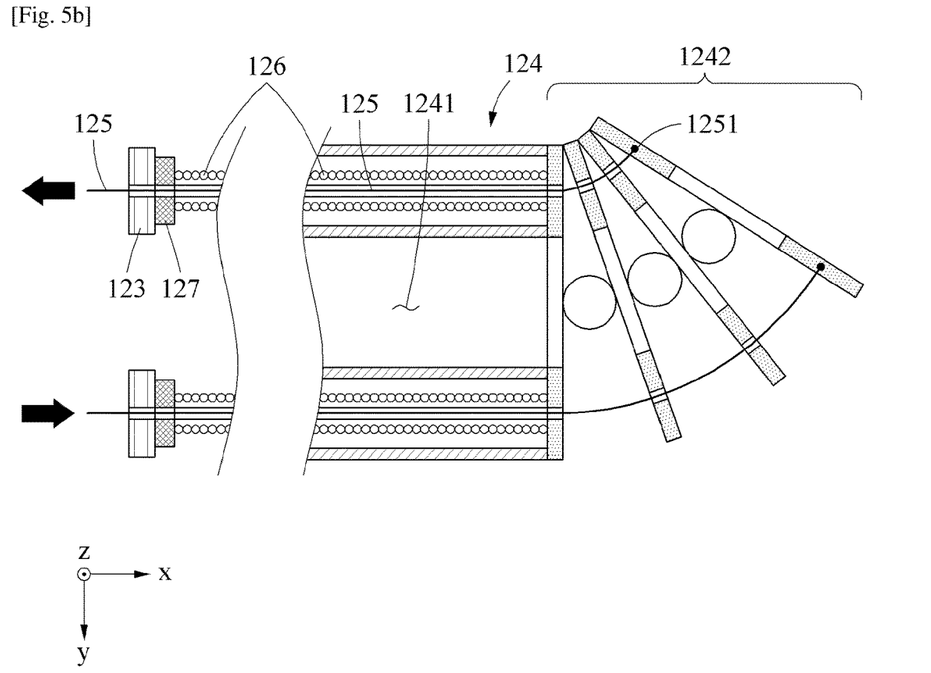
Figure 6:
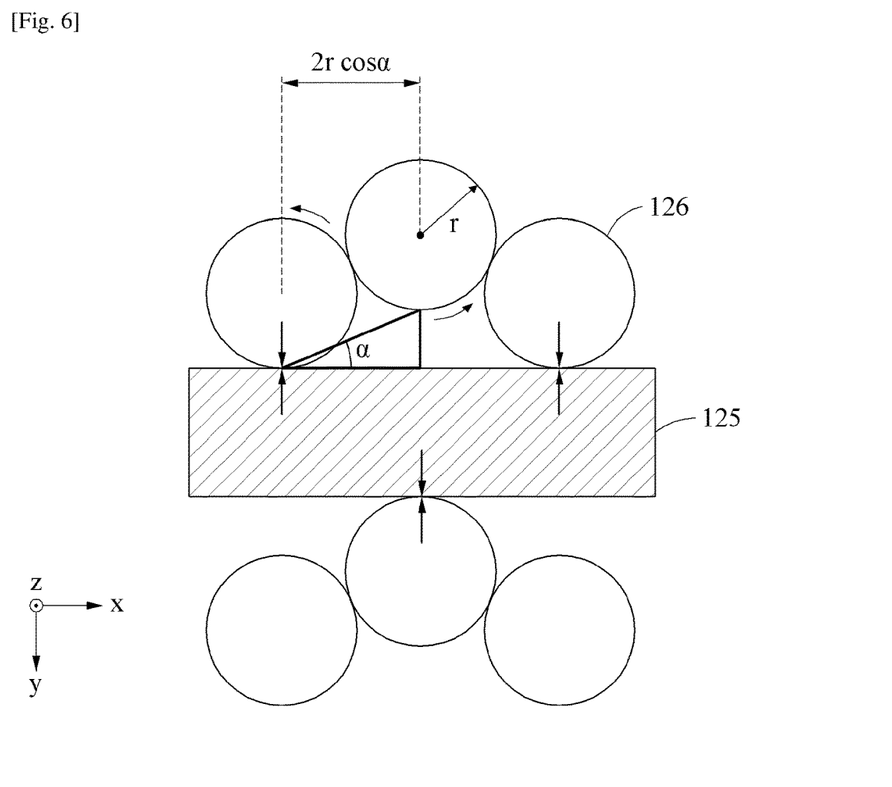
FIG. 6 is a cross-sectional view illustrating how a bending wire comes into contact with a coil sheath as the bending wire bends according to an example embodiment.

FIG. 2 is a perspective view of a modular endoscopic device according to an example embodiment. FIG. 3 is a block diagram of a modular endoscopic device according to an example embodiment. FIG. 4 is a partial perspective view of an interior of an endoscope module according to an example embodiment. FIGS. 5a and 5b are cross-sectional views illustrating how a bending wire and a coil sheath are connected according to an example embodiment. FIG. 6 is a cross-sectional view illustrating how a bending wire comes into contact with a coil sheath as the bending wire bends according to an example embodiment.

Referring to FIGS. 2 through 6, a modular endoscopic device 1 includes a base portion 11, a camera module 13, a surgical instrument module 14, an endoscope module 12, a driver 15, and a controller 16.

The base portion 11 is a member on which the endoscope module 12 is mounted and configured to serve as a base for operations of the endoscope module 12. For example, the camera module 13 and the surgical instrument module 14 are mounted on the base portion 11 to be connected to the endoscope module 12 and operate thereby.

For example, the base portion 11 includes a surface onto which the camera module 13, the surgical instrument module 13, and the endoscope module 12 are mounted, and the surface is referred to as a mounting portion 111.

For example, the endoscope module 12 is installed in front of the camera module 13 and the surgical instrument module 14 on the base portion 11 in a direction in which an insertion tube 124 of the endoscope module 12 protrudes.

The camera module 13 includes a camera housing 131 mounted on the base portion 11, and a camera tube 132 formed to protrude to an outside of the camera housing 131.

The camera housing 131 is mounted on the base portion 11 and fixed thereto. For example, the camera housing 131 includes a device configured to perform imaging through the camera tube 132.

The camera tube 132 may be an optical fiber connected to such imaging device included in the camera housing 131 and configured to transfer an image. The camera tube 132 performs imaging by passing through the insertion tube 124 of the endoscope module 12. The camera tube 132 is detachably attachable to the camera housing 131, and may thus be readily replaceable when separating the endoscope module 12 from the base portion 11.

The surgical instrument module 14 includes a surgical instrument housing 141 mounted on the base portion 11, and a surgical instrument tube 142 formed to protrude to an outside of the surgical instrument housing 141.

The surgical instrument housing 141 is mounted on the base portion 11 and fixed thereto. For example, the surgical instrument housing 141 includes a separate driver to operate the surgical instrument tube 142. The driver may be construed as including a device that is actively operated and a device that is manually operated by a user.

The surgical instrument tube 142 may be a tube-type surgical instrument formed to protrude from the surgical instrument housing 141. For example, the surgical instrument forming the surgical instrument tube 142 may include various surgical endoscopic instruments including, for example, a basket, a cautery, and a pair of scissors or tweezers for an endoscope.

The surgical instrument tube 142 passes through the insertion tube 124 of the endoscope module 12 to operate a surgical site, or remove or capture a stone.

The endoscope module 12 is mounted on the base portion 11 and configured to perform an endoscopic examination or procedure through the insertion tube 124 to be inserted into a body of a subject for the endoscopic examination or procedure.

The endoscope module 12 is detachably attachable to the base portion 11. For example, the endoscope module 12 is detachably provided to the base portion 11 through various methods generally known to a person having ordinary skill in the art, for example, engaging or fitting, and screw tightening. Detailed descriptions of these generally known methods are omitted here for brevity. The endoscope module 12 includes an endoscope housing 121, the insertion tube 124, a coil sheath 126, a bending wire 125, a sheath stopper 127, a vibrator 123, and a bending assembly 122.

The endoscope housing 121 is a housing-type member that is detachably attachable to the base portion 11. For example, the endoscope housing 121 includes a camera port 1211 configured to accommodate the camera tube 132, a surgical instrument port 1212 configured to accommodate the surgical instrument tube 142, and an insertion tube port 1213 configured to accommodate the insertion tube 124 protruding from an inside of the endoscope housing 121 to an outside thereof. Here, a direction in which the insertion tube 124 protrudes from the endoscope housing 121 is referred to as a protruding direction.

For example, the insertion tube port 1213 is formed in a portion of the endoscope housing 121 facing the protruding direction, and the camera port 1211 and the surgical instrument port 1212 are formed in a portion of the endoscope housing 121 facing an opposite direction of the protruding direction.

For example, as illustrated in FIG. 2, the camera module 13 and the surgical instrument module 14 are disposed separately from each other in a direction opposite to a direction in which the insertion tube 124 protrudes from the endoscope housing 121, and the camera tube 132, the surgical instrument tube 142, and the insertion tube 124 are disposed in parallel with one another.

Through such structure, it is possible to reduce a friction inside the insertion tube 124 by maintaining a straight path through which the camera tube 132 and the surgical instrument tube 142 are introduced to the insertion tube 124 while providing a compact structure. Thus, it is possible to improve control performance of each of the camera tube 132 and the surgical instrument tube 142.

The insertion tube 124 may be a flexible tube connected to the endoscope housing 121 to be inserted into a body of a subject or a target. For example, the insertion tube 124 includes a channel 1241 and a bending portion 1242.

The channel 1241 may be a cavity formed inside along in a longitudinal direction of the insertion tube 124. The camera tube 132 and/or the surgical instrument tube 142 are inserted therein and passes therethrough. For example, the channel 1241 may be formed as a single cavity through which the camera tube 132 and the surgical instrument tube 142 pass together. However, it may also be formed as a plurality of cavities to accommodate the camera tube 132 and the surgical instrument tube 142 separately.

The bending portion 1242 is disposed at an end portion of the insertion tube 124, and includes a bendable structure. For example, the bending portion 1242 includes a plurality of ring members each having a hole communicating with the channel 1241, and a connector disposed between the ring members and connect neighboring ring members to be mutually rotatable. For example, the connector may have a rotational joint structure. For another example, such ring connector may be formed of a flexible material to allow neighboring ring members to be relatively rotatable to each other. Unless otherwise described, a means generally known to a person having ordinary skill in the art may be applied to the bending portion 1242, and the relevant drawings illustrate it conceptually.

The insertion tube 124 accommodates the bending wire 125 to be inserted along in a longitudinal direction in an outer edge portion of the channel 1241 and fixed to an end portion of the bending portion 1242, and the coil sheath 126 to be inserted along in the longitudinal direction in the outer edge portion of the channel 1241 and fixed to a beginning portion of the bending portion 1242. That is, a hole is formed in the outer edge portion of the channel 1241 to accommodate the bending wire 125 and the coil sheath 126.

The bending wire 125 is configured to transfer power to bend the bending portion 1242. The bending wire 125 is driven or operated by the bending assembly 122, and transfers power to an end portion of the bending portion 1242 and bends the bending portion 1242 as illustrated in FIG. 5b. Here, the bending portion 1242 is bent in a direction in which the bending wire 125 is pulled. The bending wire 125 used herein may not be necessarily construed as being a single strand. For example, although it is illustrated that both ends of one bending wire 125 are fixed to both sides of the bending portion 1242 and a middle portion of the bending wire 125 is supported by the bending assembly 122, one end portion of each of separate two bending wires 125 may be fixed to both sides of the bending portion 1242 and the other end portion of each of the bending wires 125 may be supported by the bending assembly 122.

The coil sheath 126 has a higher level of rigidity than the insertion tube 124. By the coil sheath 126, it is possible to reduce a probability of the insertion tube 124 being buckled even when a high level of tension is applied to the bending wire 125, and thus maintain a path length of the insertion tube 124 and the bending wire 125. That is, it is possible to improve accuracy in controlling the bending portion 1242 by the bending wire 125. In addition, the coil sheath 126 is provided to surround a circumference of the bending wire 125, and an inner diameter of the coil sheath 126 is greater than an outer diameter of the bending wire 125. By the coil sheath 126, it is possible to prevent a friction that may be caused by a direct contact between an outer surface of the bending wire 125 and an inner surface of the insertion tube 124, and enable the bending wire 125 to operate smoothly. For example, the coil sheath 126 is formed in a type of a coil that extends while surrounding continuously a circumference of the bending wire 125. One end of the coil sheath 126 is fixed to a beginning portion of the bending portion 1242, and the other end of the coil sheath 126 is fixed to the sheath stopper 127 disposed outside the insertion tube 124.

The sheath stopper 127 accommodates the bending wire 125 protruding to an outside of the insertion tube 124 with the bending wire 125 passing therethrough, and supports the coil sheath 126 to prevent the coil sheath 126 from receding from the insertion tube 124. The sheath stopper 127 has a cavity through which the bending wire 125 passes. A diameter of the cavity is greater than a diameter of the bending wire 125, and less than a diameter of the coil sheath 126. Thus, the bending wire 125 may move in a longitudinal direction without being interfered by the sheath stopper 127, and the coil sheath 126 may be interfered by the sheath stopper 127 and be fixed thereto without moving further in a direction in which the coil sheath 126 protrudes from the insertion tube 124.

The vibrator 123 is connected to the sheath stopper 127 to vibrate the sheath stopper 127. For example, the vibrator 123 includes a vibration bock 1232 connected to the sheath stopper 127 in the endoscope module 12 and exposed from a portion in which the endoscope module 12 is connected to the base portion 11, and a vibration actuator 1231 provided in the base portion 11 and connected to the vibration block 1232 to generate a vibration force.

Figure 7A:
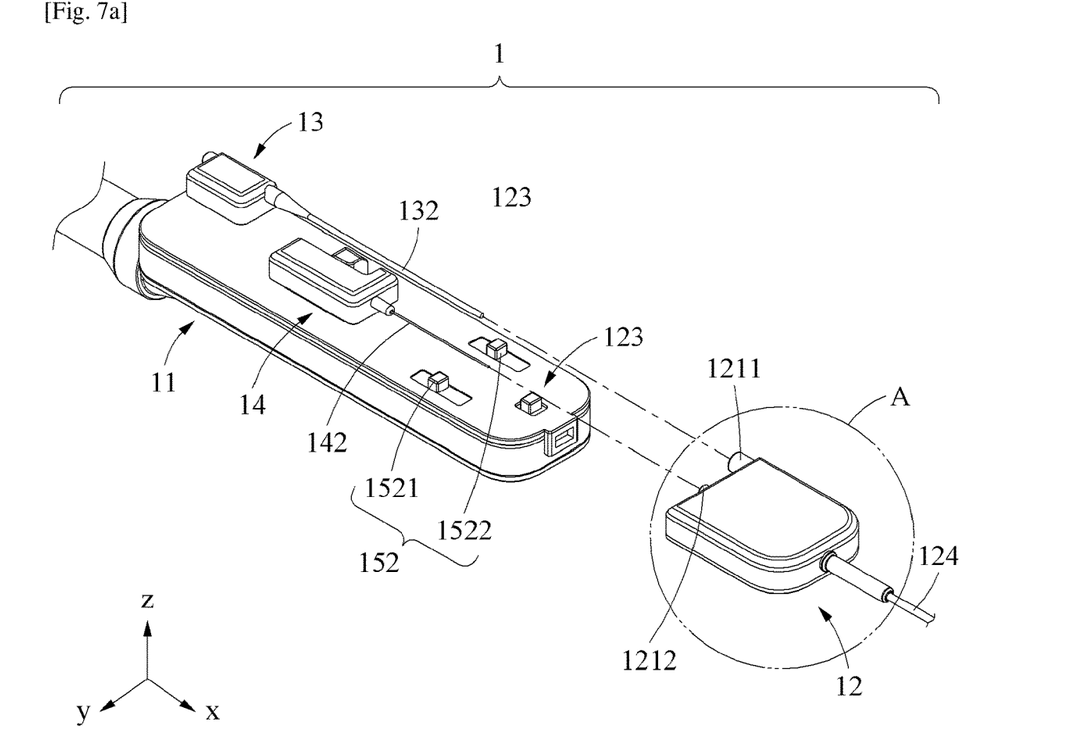
FIG. 7a is a perspective view illustrating how an endoscope module is separated according to an example embodiment.
Figure 7B:
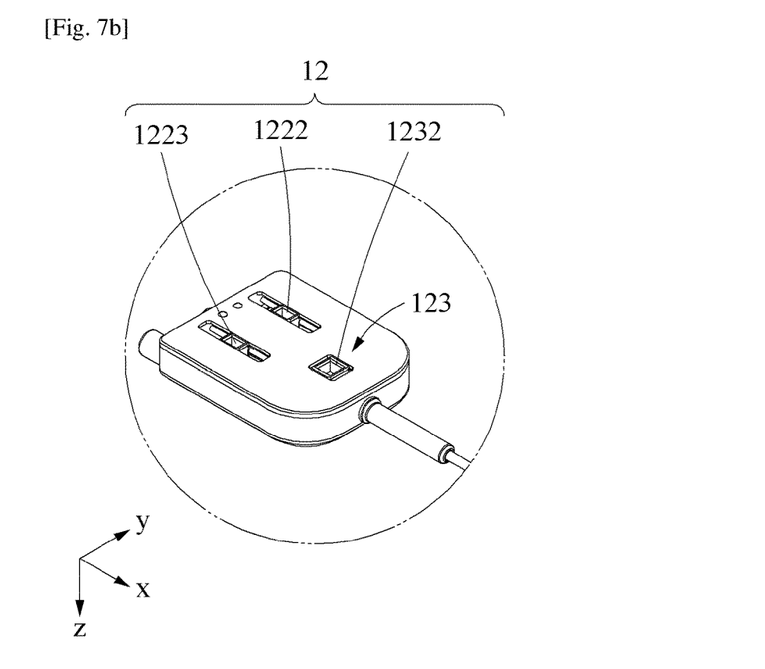

For example, the vibration actuator 1231 is provided in a protruding shape that protrudes to an outside of the mounting portion 111 as illustrated in FIGS. 7a and 7b, and the vibration block 1232 include a recessed groove such that a portion of the endoscope module 12 exposed to the mounting portion 111 is engaged with such protruding portion of the vibration actuator 1231.

Through such structure, when the endoscope module 12 is mounted on the base portion 11, the vibration actuator 1231 and the vibration block 1232 are connected to each other, and thus a vibration generated in the vibration actuator 1231 may vibrate the sheath stopper 127 through the vibration block 1232.

For example, the vibration actuator 1231 includes an ultrasonic vibrator, an actuator configured to vibrate in at least one direction, or an eccentric motor configured to generate a vibration through a rotational force.

The vibrator 123 is configured to vibrate the sheath stopper 127 relative to the bending wire 125, thereby vibrating the coil sheath 126 relative to the bending wire 125. Through this, it is possible to reduce a frictional force between the bending wire 125 and the coil sheath 126.

FIG. 6 is a diagram illustrating an example of how buckling occurs due to a compressive force applied to the coil sheath 126 when the insertion tube 124 is bent by a predetermined angle or greater or when tension of a predetermined magnitude or greater is applied to the bending wire 125. When a cross section of a linear material that forms a coil shape of the coil sheath 126 is round as illustrated, slip may be prone to occur in portions adjacent to the linear material due to a compressive force. When being bent by an angle α as illustrated, a unit distance of such coil member in the longitudinal direction of the bending wire 125 may be reduced from 2r to 2r cos α. In such case, a difference in relative length between the coil sheath 126 and the bending wire 125 may occur, and a portion of the bent coil sheath 126 may apply a normal force to the bending wire 125 and a frictional force therebetween may increase. Thus, a transfer rate of tension through the bending wire 125 may be reduced, and the tension may be irregularly formed based on a curvature at which the coil sheath 126 is bent or curved. Thus, there may be a probability of generating an error of a control amount through the bending wire 125. However, it is verified through experiments that a frictional force generated between the coil sheath 126 and the bending wire 125 is reduced by finely vibrating the coil sheath 126 through the vibrator 123. Thus, it is possible to increase a force transfer efficiency of the bending wire 125, and effectively reduce a control error. In a case of an existing endoscope, it is not easy to operate the bending wire 125 while being bent by a certain angle, for example, 180° to 270°, due to such an internal frictional force, and such an issue may arise more particularly from decrepit endoscopes. However, according to an example embodiment, such an issue may be effectively solved. Thus, according to an example embodiment, it is possible to unrestrictedly operate the bending wire 125 even in a state in which an endoscope is bent by up to 270°.

Figure 8:
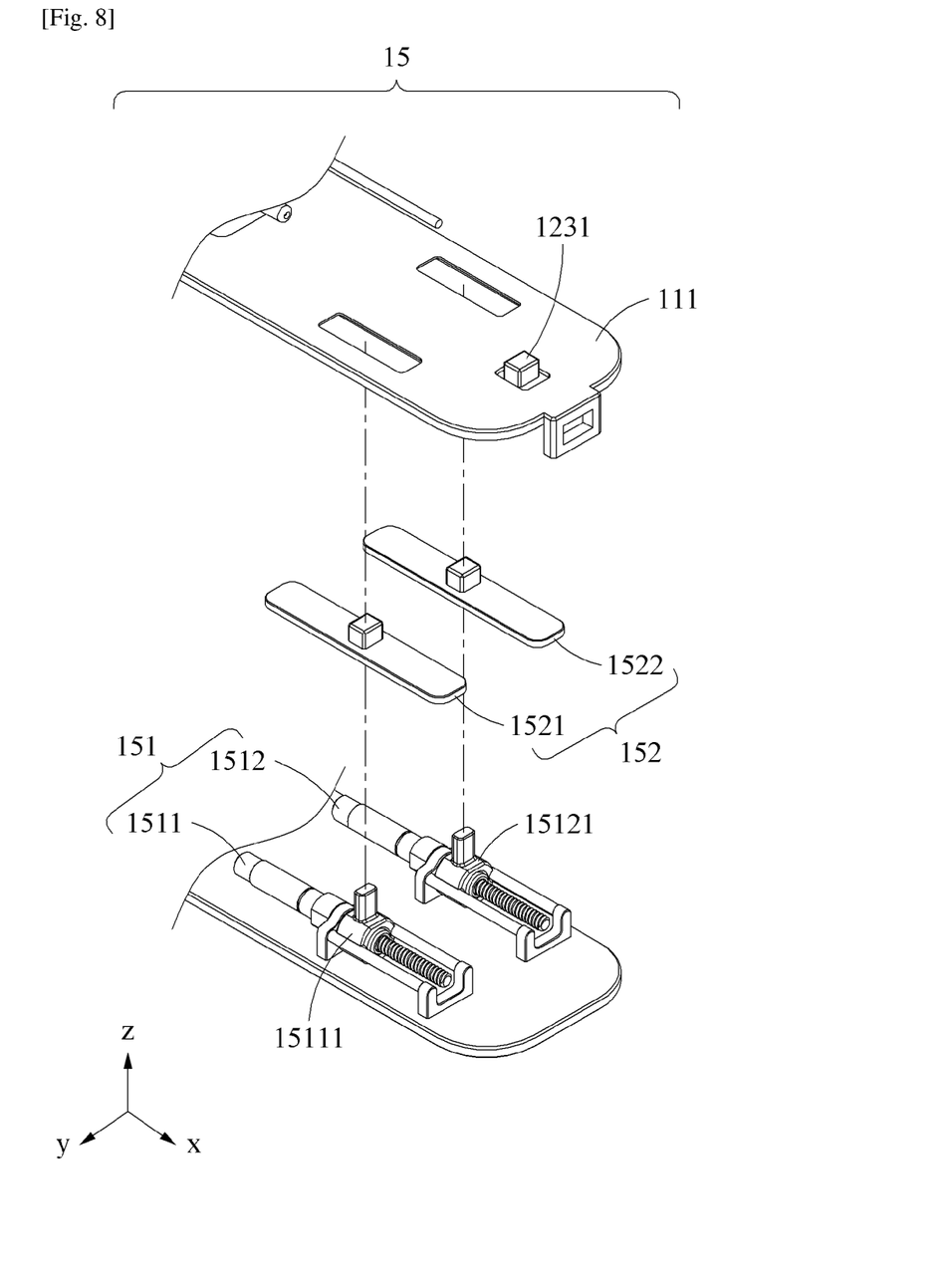
FIG. 8 is an exploded perspective view of a base portion according to an example embodiment.
Figure 9:
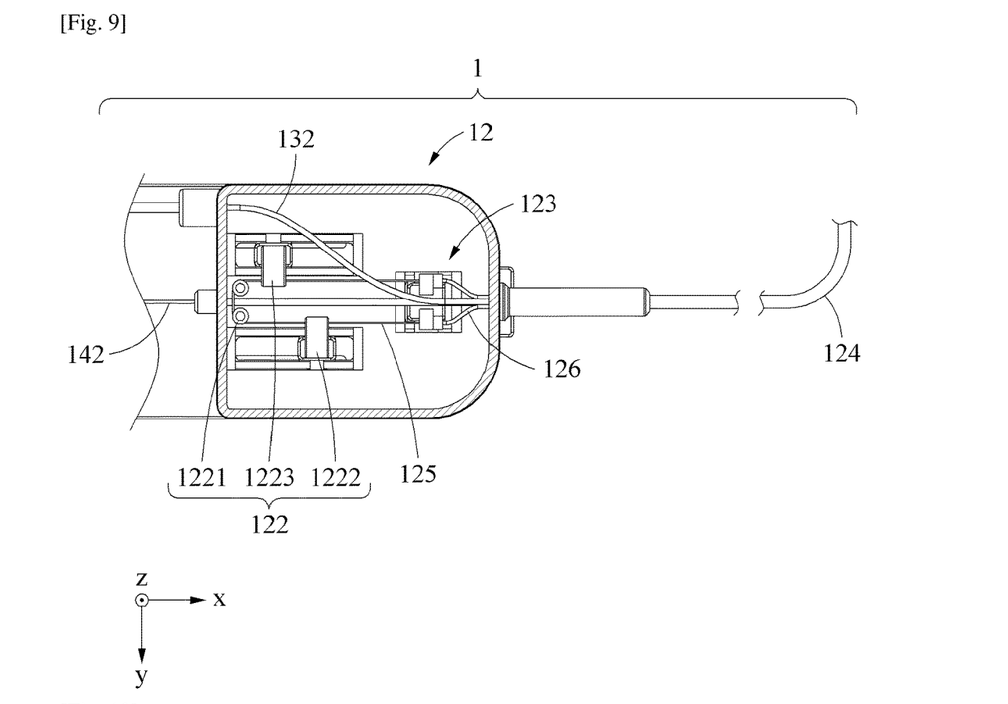
FIG. 9 is a diagram illustrating an example of how an endoscope module is bent in one direction according to an example embodiment.
Figure 10:
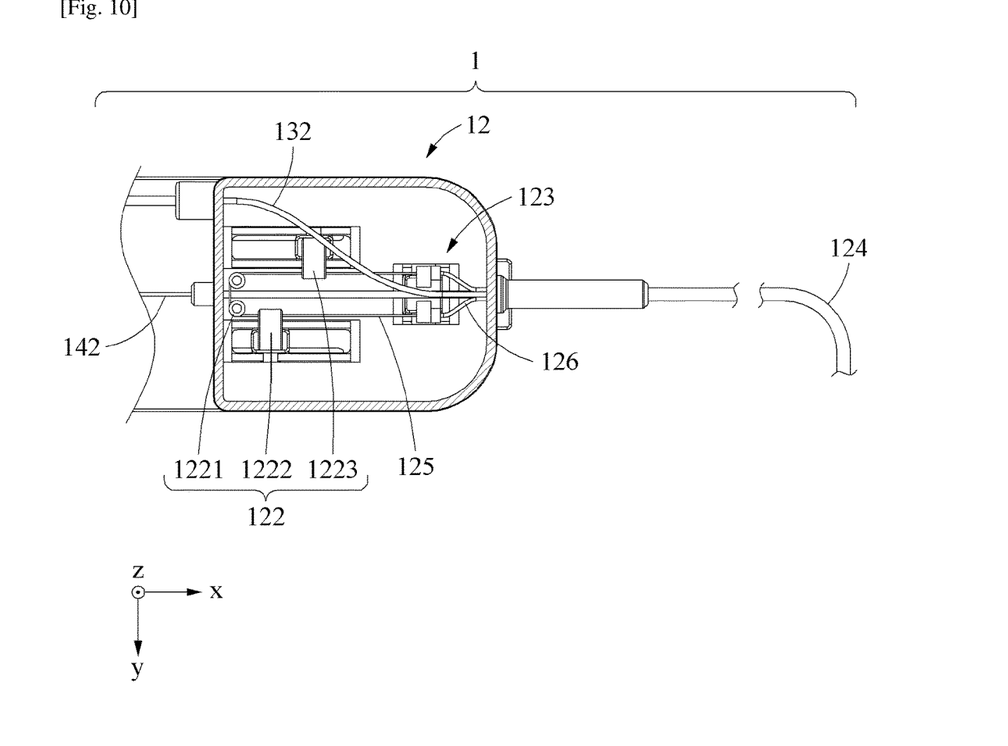
FIG. 10 is a diagram illustrating an example of how an endoscope module is bent in another direction according to an example embodiment.

FIG. 7a is a perspective view illustrating how an endoscope module is separated according to an example embodiment, and FIG. 7b is a diagram illustrating a lower surface of an area A illustrated in FIG. 7a. FIG. 8 is an exploded perspective view of a base portion according to an example embodiment. FIG. 9 is a diagram illustrating an example of how an endoscope module is bent in one direction according to an example embodiment. FIG. 10 is a diagram illustrating an example of how an endoscope module is bent in another direction according to an example embodiment.

Hereinafter, a bending operation or motion of the endoscope module 12 of the modular endoscopic device 1, and an element that is provided in a modular manner for easier replacement will be described with reference to FIGS. 7 through 10. According to an example embodiments, it is possible to replace only the endoscope module 12 that is already used while maintaining the driver 15 of the modular endoscopic device 1 which is relatively expensive, and thus prevent or block an infection that may be caused by the endoscope module 12 and reduce a cost that may increase otherwise.

The insertion tube 124 is bent by the bending assembly 122 that transfers power through the bending wire 125. The bending assembly 122 is provided in the endoscope housing 121 and configured to grab the bending wire 125 protruding to an outside of the insertion tube 124. The bending assembly 122 includes a pulley 1221 on which the bending wire 125 is hung, a first gripper 1222 configured to grab one side of the bending wire 125, and a second gripper 1223 configured to grab the other side of the bending wire 125.

The pulley 1221 is disposed between the first gripper 1222 and the second gripper 1223, on a path through which the bending wire 125 passes, and thus supports the bending wire 125.

For example, the first gripper 1222 and the second gripper 1223 are connected to the driver 15, and provided movably relative to the endoscope housing 121. The first gripper 1222 and the second gripper 1223 are slidable along in the longitudinal direction of the bending wire 125. Herein, such sliding direction is in parallel to the protruding direction. For example, the first gripper 1222 and the second gripper 1223 are disposed separately to each other side by side on both sides from a center line of the insertion tube 124 that is in parallel with the protruding direction. Thus, a sliding direction of the first gripper 1222 and a sliding direction of the second gripper 1223 are opposite to each other.

For example, the first gripper 1222 and the second gripper 1223 are detachably attachable to the driver 15 through engaging or fitting. For example, a portion of each of the first gripper 1222 and the second gripper 1223 that is connected to the driver 15 may be exposed to an outside of the endoscope housing 121.

For example, as illustrated in FIGS. 7a and 7b, the endoscope housing 121 is provided with a hole cut or opened such that the portion of the first gripper 1222 and the second gripper 1223 connected to the driver 15 is exposed to outside. The first gripper 1222 and the second gripper 1223 include respective grooves or protrusions to be engaged respectively with a first driving coupler 1521 and a second driving coupler 1522 of the driver 15 exposed on the mounting portion 111.

The driver 15 is provided in the base portion 11 and connected to the endoscope module 12 to slide the first gripper 1222 and the second gripper 1223 along in the protruding direction. The driver 15 slides the first gripper 1222 and the second gripper 1223 in opposite directions to bend the insertion tube 124. For example, the driver 15 includes a driving source 151, and a driving coupler 152.

The driving source 151 is configured to transfer power to the grippers 1222 and 1223 through the driving coupler 152. For example, the driving source 151 is provided inside the mounting portion 111. The driving source 151 may be driven or operated by, for example, an oil pressure, an air pressure, or electric power.

The driving source 151 includes a first driving source 1511 configured to slide the first gripper 1222, and a second driving source 1512 configured to slide the second gripper 1223.

In a case of a linear type, the first driving source 1511 and the second driving source 1512 respectively include linear structures, for example, linear guides, ball screws, and cylinders, that transfer a translational motion force, and sliders 15111 and 15121 that move linearly along in a direction parallel to a longitudinal direction of the linear structures.

In a case of a rotational type, the first driving source 1511 and the second driving source 1512 respectively include rotating pulleys and wires wound around the rotating pulleys, and the sliders 15111 and 15121 connected respectively to both sides of the wires. For example, each of the first and second driving sources 1511 and 1512 may include a pinion, a rack engaged with both sides of the pinion, and a slider, for example, the sliders 15111 and 15121, respectively, that is connected to each of the racks on both sides. A detailed description of such structure is omitted here for brevity.

The driving coupler 152 is connected to the driving source 151, and at least a portion thereof is exposed to an outside of the base portion 11 to be connected to the first gripper 1222 and the second gripper 1223. The driving coupler 152 includes the first driving coupler 1521 to be connected to the first gripper 1222 through the slider 15111 of the first driving source 1511, and the second driving coupler 1522 to be connected to the second gripper 1223 through the slider 15121 of the second driving source 1512. As illustrated in FIG. 7a, holes are formed in the mounting portion 111 so that the first driving coupler 1521 and the second driving coupler 1522 are exposed to the outside.

For example, the first driving coupler 1521 and the second driving coupler 1522 have a protruding shape protruding to an outside of the mounting portion 111, and the first gripper 1222 and the second gripper 1223 have a groove shape corresponding to the protruding shape, and thus they may be combined to each other. Alternatively, as illustrated in FIGS. 7a and 7b, the first gripper 1222 and the second gripper 1223 may be disposed inside not to protrude to an outside of the endoscopic housing 121.

The controller 16 is configured to allow the insertion tube 124 to be bent, and the coil sheath 126 to vibrate. The controller 16 operates the driving source 151 to slide the first gripper 1222 and the second gripper 1223. For example, the controller 16 allows two driving sources 151 to translate in opposite directions, thereby adjusting a bending direction and a bending degree of the insertion tube 124.

For example, when moving the first driving source 1511 forwards while receding the second driving source 1512 based on the protruding direction as illustrated in FIG. 9, the second gripper 1223 may pull the bending wire 125 and simultaneously the first gripper 1222 may guide the bending wire 125 to a position where it is further inserted into the insertion tube 124, and thus the insertion tube 124 may be bent in a direction of the second gripper 1223 in which the bending wire 125 is pulled or stretched.

Conversely, when moving the second driving source 1512 forwards while receding the first driving source 1511 as illustrated in FIG. 10, the first gripper 1222 may pull the bending wire 125 and simultaneously the second gripper 1223 may guide the bending wire 125 to a position where it is further inserted into the insertion tube 124, and thus the insertion tube 124 may be bent in a direction of the first gripper 1222 in which the bending wire 125 is pulled or stretched.

The controller 16 operates the vibrator 123 to vibrate the sheath stopper 127. For example, the controller 16 generates a relative vibration motion between the bending wire 125 and the coil sheath 126 in the longitudinal direction of the bending wire 125 through the vibrator 123, and thus reduces a frictional resistance between the bending wire 125 and the coil sheath 126.

For example, the controller 16 adjusts a magnitude of a vibration force through the vibrator 123 in proportion to a bending angle of the insertion tube 124. Through this, it is possible to respond flexibly to a frictional resistance that varies between the bending wire 125 and the coil sheath 126 depending on a degree to which the insertion tube 124 is bent. For example, a bending angle of the insertion tube 124 is determined based on a relative distance between the sliders 15111 and 15121 of the driving source 151.

For example, the controller 16 repeatedly moves the first gripper 1222 and the second gripper 1223 through the driver 15 within respectively set micro-displacements, and thus the bending wire 125 performs repeated translational motions with respect to the coil sheath 126 within a micro-displacement.

Thus, it is possible to reduce a frictional resistance between the bending wire 125 and the coil sheath 126 through the vibration of the sheath stopper 127, and more effectively reduce the frictional resistance further by repeatedly translating the bending wire 125 within a micro-displacement through the driver 15.

Alternatively, it is still possible to reduce a friction only by repeated translational motions of the bending wire 125 through the driver 15, without the vibration of the sheath stopper 127.

According to an example embodiment, there is provided a modular endoscopic device. An endoscope module of the modular endoscopic device may be simply attachable and detachable in a modular manner, enabling easier replacement, and it is thus possible to prevent an infection that may be caused by an endoscopy.

According to an example embodiment, there is provided a modular endoscopic device. The modular endoscopic device may reduce a frictional resistance generated between a wire and a sheath when it vibrates a sheath stopper through a vibrator to bend a flexible insertion tube or when buckling occurs in the sheath. Thus, it is possible to stably increase efficiency in transferring a force through the wire and reduce a control error.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A modular endoscopic device comprising:
a base portion having a top, outer mounting surface onto which a camera module and a surgical instrument module are mounted, wherein the camera module includes a camera housing extending upward from the mounting surface and a camera tube and wherein the surgical instrument module includes a surgical instrument housing extending upward from the mounting surface and a surgical instrument tube;
a driver provided in the base portion beneath the mounting surface; and
an endoscope module including an endoscope housing with a lower surface, an insertion tube including a bendable bending portion and connected to the endoscope housing to be inserted into a body of a subject, and a bending wire configured to transfer a force to bend the bending portion,
wherein the lower surface of the endoscope module is detachably attachable to the mounting surface of the base portion distal to the camera housing and the surgical instrument housing such that, when the lower surface engages with the mounting surface, the endoscope housing extends upward from the mounting surface, and wherein the camera tube runs above the mounting surface from the camera housing to the endoscope module and the surgical instrument tube runs above the mounting surface from the surgical instrument housing to the endoscope module, and
when the endoscope module is attached to the base portion, the driver is configured to transfer power to the bending wire, and
when the endoscope module is detached from the base portion, the driver is configured not to transfer power to the bending wire.

2. The modular endoscopic device of claim 1, wherein the endoscope module includes:

a first gripper accessible via a first hole in the lower surface, movable relative to the endoscope housing, and configured to grab one side of the bending wire to transfer a force to the bending wire; and
a second gripper accessible via a second hole in the lower surface, movable relative to the endoscope housing, and configured to grab another side of the bending wire to transfer a force to the bending wire,
wherein the driver includes:
a first driving coupler movable relative to the base portion, protruding from the mounting surface, and being detachably attachable to the first gripper; and
a second driving coupler movable relative to the base portion, protruding from the mounting surface, and being detachably attachable to the second gripper.

3. The modular endoscopic device of claim 2, wherein the driver further includes:
a first driving source configured to drive the first driving coupler to slide along in a longitudinal direction of the insertion tube; and
a second driving source configured to drive the second driving coupler to slide along in the longitudinal direction of the insertion tube.

4. The modular endoscopic device of claim 3, wherein the first driving source and the second driving source are configured to move the first gripper and the second gripper in different respective directions along in the longitudinal direction of the insertion tube to translate the bending wire and bend the insertion tube in different directions.

5. The modular endoscopic device of claim 1, wherein the endoscope module further includes:
a coil sheath configured to surround a circumference of the bending wire to be inserted into the insertion tube and guide a path through which the bending wire operates; and
a sheath stopper configured to support the coil sheath to prevent the coil sheath from receding from the insertion tube.

6. The modular endoscopic device of claim 5, further comprising:
a vibrator configured to vibrate the coil sheath by vibrating the sheath stopper to reduce a frictional force between the coil sheath and the bending wire.

7. The modular endoscopic device of claim 6, wherein the vibrator is configured to vibrate the coil sheath by a magnitude of a vibration force generated through the vibrator in proportion to a bending angle of the insertion tube.

8. The modular endoscopic device of claim 1,
wherein the camera housing includes an imaging device and
the camera tube is detachably attachable to the camera housing, and connected to the imaging device to perform imaging in the bending portion of the insertion tube.

9. The modular endoscopic device of claim 2, wherein the endoscope module includes a pulley between the first gripper and the second gripper through which the bending wire passes.

10. The modular endoscopic device of claim 2, wherein the camera module and the surgical instrument module are disposed separately from each other in a direction opposite to a direction in which the insertion tube protrudes from the endoscope module when the endoscope module is attached to the base portion.

11. The modular endoscopic device of claim 10, wherein the endoscope module includes a camera port configured to accommodate the camera tube, a surgical instrument port configured to accommodate the surgical instrument tube, and an insertion tube port configured to accommodate the insertion tube, each protruding from an inside of the endoscope module to an outside thereof.

* * * * *